(12) United States Patent  
Perry

(10) Patent No.: US 9,182,775 B2  
(45) Date of Patent: Nov. 10, 2015

(54) FOOT-OPERATED CONTROL ASSEMBLIES AND CONTROL METHODS FOR MOTORCYCLES

(76) Inventor: David Gibson Perry, South Bend, IN (US)

(*) Notice: Subject to any disclaimer, the term of this patent is extended or adjusted under 35 U.S.C. 154(b) by 323 days.

(21) Appl. No.: 12/903,313

(22) Filed: Oct. 13, 2010

(65) Prior Publication Data

US 2011/0247444 A1 Oct. 13, 2011

Related U.S. Application Data

(60) Provisional application No. 61/250,960, filed on Oct. 13, 2009.

(51) Int. Cl.
| | |
|---|---|
| *B60K 20/00* | (2006.01) |
| *G05G 1/445* | (2008.04) |
| *F16H 59/02* | (2006.01) |
| *B62M 25/06* | (2006.01) |

(52) U.S. Cl.
CPC .............. *G05G 1/445* (2013.01); *B62M 25/06* (2013.01); *F16H 59/02* (2013.01); *B60Y 2200/12* (2013.01); *F16H 2059/0234* (2013.01); *Y10T 74/20061* (2015.01); *Y10T 74/20528* (2015.01)

(58) Field of Classification Search
CPC .................................. B60T 7/00; G05G 17/00
USPC ........................................................ 74/473.17
See application file for complete search history.

(56) References Cited

U.S. PATENT DOCUMENTS

| | | | | | |
|---|---|---|---|---|---|
| 3,181,668 | A | * | 5/1965 | Siuk ............................. | 192/48.9 |
| 3,252,550 | A | * | 5/1966 | Kitchen ........................ | 192/3.63 |
| 3,741,356 | A | * | 6/1973 | Sieren et al. ................. | 192/3.61 |
| 3,919,896 | A | | 11/1975 | Foster | |
| 4,086,823 | A | * | 5/1978 | Fatur ............................ | 74/473.16 |
| 4,091,889 | A | * | 5/1978 | Brown et al. ................. | 180/273 |
| 4,114,738 | A | * | 9/1978 | Brown et al. ................. | 192/218 |
| 4,631,034 | A | | 12/1986 | Menne et al. | |
| 4,759,417 | A | * | 7/1988 | Wanie et al. ................. | 180/6.34 |
| 4,958,607 | A | * | 9/1990 | Lundberg ....................... | 123/399 |
| 5,152,382 | A | * | 10/1992 | Hoch et al. .................... | 192/218 |
| 5,231,891 | A | * | 8/1993 | Morita et al. .................. | 74/512 |
| 5,661,999 | A | * | 9/1997 | Carone ......................... | 74/473.16 |
| 5,738,180 | A | | 4/1998 | Hofmann et al. | |
| 5,826,463 | A | | 10/1998 | Monson | |
| 5,890,545 | A | | 4/1999 | Smith et al. | |
| 5,893,424 | A | | 4/1999 | Hisada | |
| 6,155,133 | A | * | 12/2000 | Swansegar et al. ............. | 74/513 |
| 6,223,623 | B1 | | 5/2001 | Vance | |
| 6,270,106 | B1 | | 8/2001 | Maki et al. | |
| 6,347,560 | B1 | * | 2/2002 | Maezawa et al. .......... | 74/473.16 |

(Continued)

*Primary Examiner* — William Kelleher  
*Assistant Examiner* — Zakaria Elahmadi  
(74) *Attorney, Agent, or Firm* — Hartman Global IP Law; Gary M. Hartman; Domenica N. S. Hartman

(57) ABSTRACT

Foot-operated assemblies and methods of using the foot-operated assemblies to control a motorcycle. A foot-operated assembly includes a shaft that defines a pivot axis, a device for mounting the shaft to the motorcycle, a rocker arm coupled to the shaft so that the rocker arm is rotatable about the pivot axis, a second arm interconnected with the rocker arm so that rotation of the rocker arm causes the second arm to rotate about the pivot axis, a feature for coupling the second arm to a gear shifter linkage or a brake cylinder rod of the motorcycle, and a foot board attached to the rocker arm so that rotation of the foot board causes the rocker arm and the second arm to rotate about the pivot axis.

18 Claims, 2 Drawing Sheets

(56) References Cited

U.S. PATENT DOCUMENTS

| | | | |
|---|---|---|---|
| 6,622,589 B1* | 9/2003 | Pino et al. | 74/513 |
| 6,719,316 B1 | 4/2004 | Anthony | |
| 6,886,677 B2* | 5/2005 | Rupiper et al. | 192/219.6 |
| 6,962,094 B2 | 11/2005 | Porter et al. | |
| 7,104,036 B2* | 9/2006 | Trefz | 56/10.2 R |
| 7,654,358 B2* | 2/2010 | Gilgallon et al. | 180/230 |
| 7,877,993 B2* | 2/2011 | Sakamoto | 60/492 |
| 7,913,799 B2* | 3/2011 | Kawashiri et al. | 180/335 |
| 8,056,697 B2* | 11/2011 | Eley et al. | 192/218 |
| 2005/0056115 A1* | 3/2005 | Da Silva et al. | 74/512 |
| 2007/0057484 A1 | 3/2007 | Gilman | |
| 2009/0026729 A1 | 1/2009 | James et al. | |
| 2009/0038870 A1 | 2/2009 | Kissick et al. | |
| 2009/0255360 A1* | 10/2009 | Witteveen et al. | 74/473.16 |
| 2009/0272215 A1* | 11/2009 | Plackis | 74/473.16 |
| 2011/0146442 A1* | 6/2011 | Gobillard | 74/560 |

\* cited by examiner

FOOT-OPERATED CONTROL ASSEMBLIES AND CONTROL METHODS FOR MOTORCYCLES

CROSS REFERENCE TO RELATED APPLICATIONS

This application claims the benefit of U.S. Provisional Application No. 61/250,960, filed Oct. 13, 2009, the contents of which are incorporated herein by reference.

BACKGROUND OF THE INVENTION

The present invention generally relates to foot-operated controls for motorcycles. More particularly, this invention relates to foot-operated gear shifting and braking controls incorporated into foot boards of a motorcycle to enable a rider to keep their feet on the foot boards at all times while shifting gears and applying brakes with simple rocking motions of the feet.

Foot boards (floor boards) are standard equipment for many motorcycles, and are provided as a more comfortable option to standard foot pegs. Foot boards are usually mounted in proximity to the foot-operated controls of a motorcycle, namely, the gear shifter lever located on the lefthand side of a motorcycle and a rear brake pedal on the righthand side of the motorcycle. U.S. Published Patent Application No. 2009/0272215 to Plackis shows the conventional location of a foot board beneath a gear shifter lever of a motorcycle. In contrast to a standard toe gear shifter configured for operation with the rider's toe, the gear shifter described in Plackis is a toe-and-heel gear shifter comprising interconnected front and rear arms. The front arm is forward of the foot board for operation with the rider's toe, while the rear arm is at the rear of the foot board for operation with the rider's heel. The arms are interconnected to facilitate the usual shifting pattern of a motorcycle. Using the movement of the front arm as reference, first gear is usually one position down from neutral while the remaining higher gears are engaged by multiple incremental positions up from neutral. The rear arm avoids the need to lift the front arm up with the toe as the rider shifts to higher gears by allowing the rider to use the heel to move the rear arm down to achieve upward movement of the front arm. Though not shown, a foot board is also presumably located slightly below and behind a rear brake pedal on the righthand side of the motorcycle.

The foot board shown in Plackis is positioned so that either the toe or heel of the rider's foot can be firmly supported by the foot board during the operation of the gear shifter. For this reason, the foot board is rigidly attached to the motorcycle frame, such that the board cannot move while supporting the rider's feet, including during operation of the gear shifter.

Toe-and-heel gear shifters are often more convention to operate than a standard toe shifter because the rider is not required to lift his or her toe when shifting to higher gears. However, riders may still find a toe-and-heel shifter to be somewhat difficult to operate. For example, certain riders that have suffered lower leg injuries may find it difficult to lift their toe off the foot board and onto the front arm in order to downshift and/or lift their heel off the foot board and onto the rear arm in order to upshift.

BRIEF DESCRIPTION OF THE INVENTION

The present invention provides foot-operated assemblies and methods of using the foot-operated assemblies to control a motorcycle.

According to a first aspect of the invention, the foot-operated assembly includes a shaft that defines a pivot axis, a device for mounting the shaft to the motorcycle, a rocker arm coupled to the shaft so that the rocker arm is rotatable about the pivot axis, a second arm interconnected with the rocker arm so that rotation of the rocker arm causes the second arm to rotate about the pivot axis, a feature for coupling the second arm to a gear shifter linkage or a brake cylinder rod of the motorcycle, and a foot board attached to the rocker arm so that rotation of the foot board causes the rocker arm and the second arm to rotate about the pivot axis.

Other aspects of the invention include methods of using a foot board, including but not limited to the foot board described above, to operate a motorcycle, for example, using the foot board as the gear shifter lever or brake pedal of a motorcycle.

A significant advantage of this invention is that a rider is able to safely rest his/her foot on the foot board while riding a motorcycle, while also enabling the rider to shift gears and/or apply a brake with a simple "rocking" motion of the rider's foot. If installed for shifting gears, the rider is able to shift gears by pressing downward on the forward portion of the foot board with the rider's toe to downshift, and by pressing downward on the rearward portion of the foot board with the rider's heel to upshift. If installed for braking, the rider is able to engage a brake of the motorcycle by pressing downward on the forward portion of the foot board with the rider's toe, and disengage the brake by pressing downward on the rearward portion of the foot board with the rider's heel. In each case, a foot-controlled operation of a motorcycle occurs as a result of the rocking motion of the rider's foot on the foot board, all while the rider's foot remains on and is supported by the foot board, and without the need to lift any portion of the rider's foot from the floor board.

Other aspects and advantages of this invention will be better appreciated from the following detailed description.

DETAILED DESCRIPTION OF THE INVENTION

FIGS. 1 through 4 represent foot boards adapted for mounting to a motorcycle and to have a pivoting or rocking action about an axis that is transverse to the foot board, so that the foot board pivots or pitches relative to the motorcycle. To achieve a preferred pivot action, the transverse axis is perpendicular to the fore-aft axis of the motorcycle, disposed between the frontmost and rearmost extents of the foot board, and disposed relative to the foot board so that the axis passes through or above the foot board. Each foot board is further adapted so that its pivoting action performs a gear shifting operation or braking operation of the motorcycle. To facilitate the description of the invention provided below, the terms "vertical," "horizontal," "lateral," "front," "rear," "side," "forward," "rearward," "upper," "lower," "above," "below," "right," "left," etc., will be used in reference to the perspective of the rider of a motorcycle on which the invention is installed, and therefore are relative terms that indicate the construction, installation and use of the invention and therefore help to define the scope of the invention.

Figure 1:
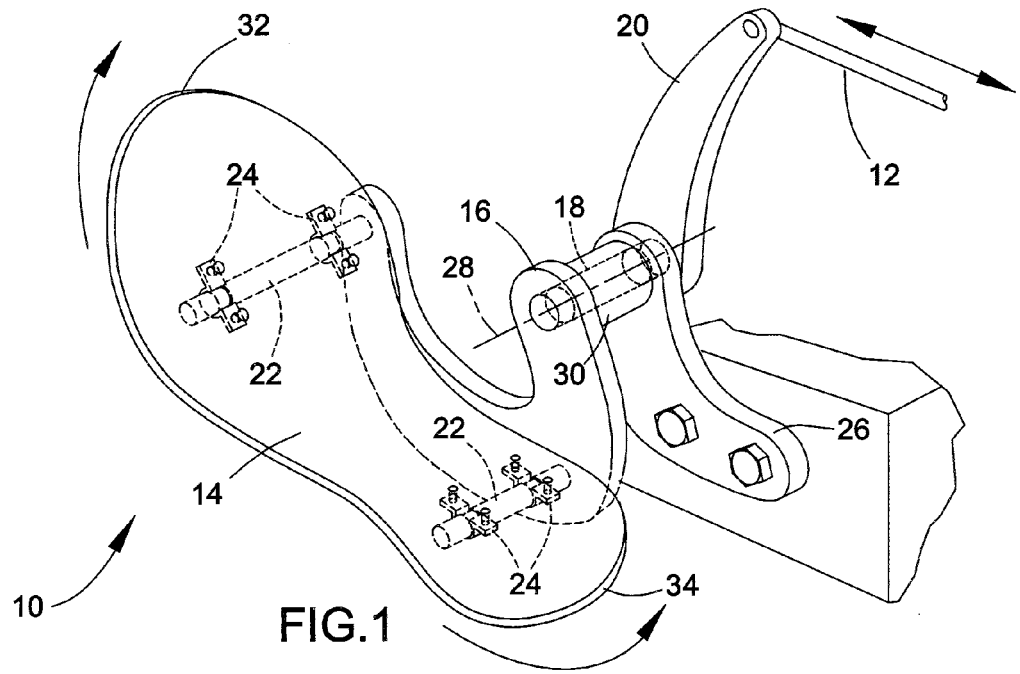
FIG. 1 is a perspective view of a foot board configured as a gear shifting assembly in accordance with an embodiment of this invention.
Figure 2:
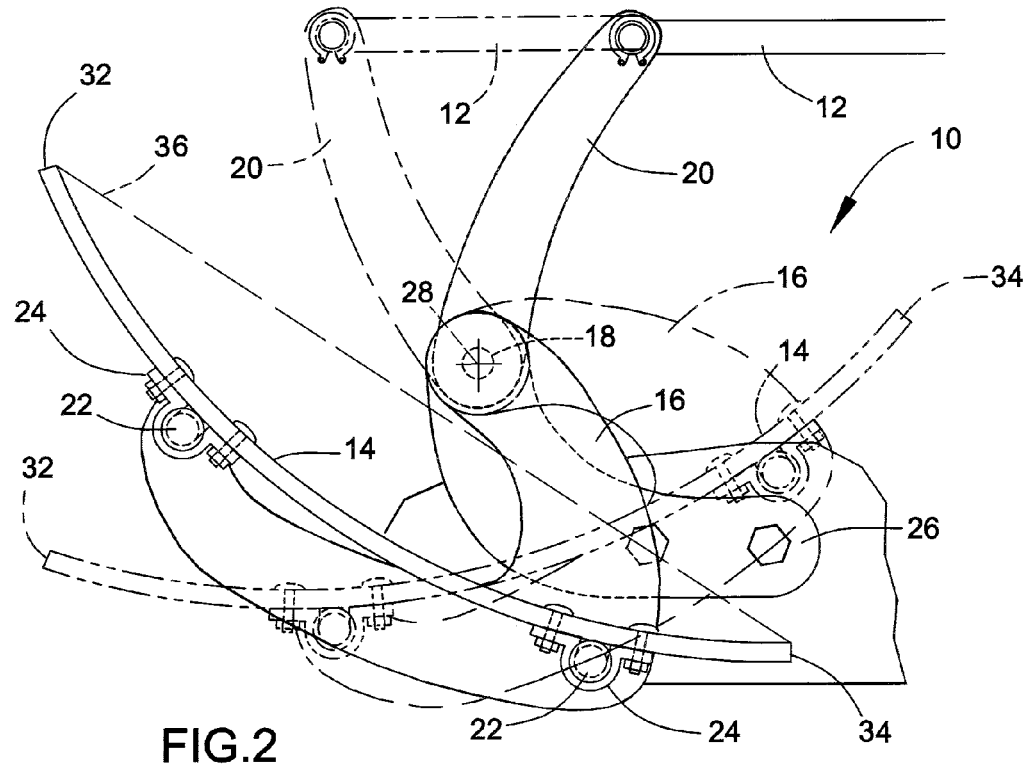
FIG. 2 represents a side view of the foot board of FIG. 1.

Referring to FIGS. 1 and 2, a gear shifting assembly 10 is represented as being adapted to perform a gear shifting operation of a motorcycle (not shown). As an example, the gear shifting operation can entail a conventional gear shifting pattern, in which first gear is engaged by moving a gear shift linkage 12 one position forward from neutral and the remaining higher gears are engaged by moving the linkage 12 multiple incremental positions rearward from neutral. It should be appreciated that other gear shifting patterns are also within the scope of the invention. Depending on the particular motorcycle on which the assembly 10 is installed, the shift linkage 12 may be a component of the gear shifting assembly 10 of this invention, or may be a pre-existing linkage of the motorcycle's transmission.

The gear shifting assembly 10 is further represented as comprising a foot board 14, a rocker arm 16 to which the foot board 14 is mounted, a shaft 18 on which the rocker arm 16 is mounted for rotation, and a shift arm 20 mounted on the shaft 18 so that the rocker and shift arms 16 and 20 rotate together, for example, as a result of at least the rocker and shift arms 16 and 20 being connected for rotation together as a unit on the shaft 18, or as a result of the rocker and shift arms 16 and 20 being secured to the shaft 18 so that the rocker and shift arms 16 and 20 and the shaft 18 rotate together as a unit as shown in FIGS. 1 and 2. As the term is used herein, "foot board" is defined as a platform of sufficient width and length to accommodate and support the entire foot of a motorcycle rider of at least average stature, and is therefore distinguishable from a standard foot peg commonly installed on motorcycles. The foot board 14 is secured to the rocker arm 16 in a manner that prevents the board 14 from rotating relative to the rocker arm 16. In FIGS. 1 and 2, the board 14 is shown secured to the rocker arm 16 with support arms 22 assembled with brackets 24 located on the bottom of the foot board 14, though other attachment methods are possible and within the scope of the invention. The support arms 22 and brackets 24 can be configured to allow the foot board 14 to be removed from the rocker arm 16.

The assembly 10 further includes a mounting plate 26 for securing the assembly 10 to a motorcycle (not shown), such as a portion of the motorcycle's frame. It should be understood that the assembly 10 is not limited to any particular configuration for the mounting plate 26, in that the mounting plate 26 may be fabricated to have any configuration necessary to allow the assembly 10 to be mounted to any particular motorcycle. In the embodiment shown in FIGS. 1 and 2, the shaft 18 is pivotably mounted within a bore formed in the mounting plate 26. To promote its ability to rotate relative to the mounting plate 26, the shaft 18 can be mounted within the bore with a bushing, for example a bronze bushing, or other suitable type of bearing assembly (not shown). The rocker arm 16, shift arm 20 and mounting plate 26 are assembled with the shaft 18 so that the shaft 18 is oriented transverse to the foot board 14 and defines a pivot axis 28 that is preferably perpendicular to the fore-aft direction of the motorcycle. The shift arm 20 is rotatably coupled to one end of the gear shift linkage 12 so that rotation of the foot board 14, rocker arm 16, and shift arm 20 about the pivot axis 28 defined by the shaft 18 causes the shift arm 20 to move the linkage 12 back and forth, and thereby perform the gear shifting operation with the transmission of the motorcycle. A spacer 30 is shown as being disposed on the shaft 18 between the rocker arm 16 and mounting plate 26 to maintain the rocker arm 16 at a distance from the mounting plate 26 and thereby position the foot board 14 at a desirable location relative to the side of the motorcycle.

In the configuration shown in FIGS. 1 and 2, the foot board 14 provides a foot rest for the left foot of a rider of the motorcycle on which the assembly 10 is installed. Because the foot board 14 is secured to the rocker arm 16, the foot board 14 can be pivoted with the rider's left foot to cause the shaft 18 and shift arm 20 (and preferably the shaft 18) to rotate, and thereby actuate the gear shift linkage 12. As such, the foot board 14 is also able to entirely replace conventional toe gear shifter assemblies and conventional toe-and-heel gear shifter assemblies of conventional motorcycles, as opposed to being in addition to an existing gear shifter assembly. As previously noted, the foot board 14 is mounted with the rocker arm 16 to have a pivoting or rocking action about the pivot axis 28 of the shaft, which is oriented transverse to the foot board 14. In this manner, the foot board 14 can be pivoted in forward and rearward directions relative to the motorcycle, which in this sense means counterclockwise and clockwise directions, respectively, when viewing the lefthand side of the motorcycle. Furthermore, the shift linkage 12 can be provided with an adjustable length (not shown) so that the angular orientation of the foot board 14 relative to the pivot axis 28 can be adjusted to promote the comfort of the rider.

Importantly, to achieve the desired pivot/rocking action for the foot board 14 capable of actuating the shift linkage 12 in both forward and rearward directions, the pivot axis 28 is disposed between the frontmost and rearmost extents 32 and 34 of the foot board 14. According to a preferred aspect of the invention, the majority of the foot board 14 is located forward of the axis 28. More preferably, greater than half and up to about three-quarters of the length of the foot board 14 is located forward of the axis 28, and in a particular embodiment about two-thirds of the foot board 14 is located forward of the axis 28. According to another preferred aspect of the invention, the foot board 14 passes beneath the pivot axis 28 and the portion of the foot board 14 directly below the axis 28 is spaced at least one inch (about 2.5 cm) from the axis 28, more preferably about two to three inches (about 5 to 8 cm) from the axis 28. As a result, the motion of the foot board 14 is not strictly or just a pivot action, but instead is a swinging motion beneath the pivot axis 28. This motion of the foot board 14 is believed to be within the ability of a rider having limited lower leg movement to allow the rider to swing/pivot the assembly 10 about the pivot axis 28 and, in so doing, actuate the gear shift linkage 12 to downshift by pressing downward with the toe near the frontmost end 32 of the foot board 14, which in addition to causing the end 32 of the foot board 14 to pitch down also causes the foot board 14 to swing slightly to the rear. Similarly, the gear shift linkage 12 is actuated to upshift by pressing downward with the heel near the rearmost end 34 of the foot board 14, which in addition to causing the end 34 of the foot board 14 to pitch down also causes the foot board 14 to swing slightly forward. Thus, shifting gears can be performed with a simple swinging/rocking motion of the rider's left foot without requiring removal of the foot from the foot board 14.

From FIGS. 1 and 2, it can be further seen that the foot board 14 has a curvature such that its upper surface is concave. This curvature is shown as being uniform and continuous along the entire length of the foot board 14 between its frontmost and rearmost extents 32 and 34. Generally speaking, the curvature of the foot board 14 is desired to provide a comfortable position of the foot throughout the swinging motion of the foot board 14. In addition, the contour of the foot board 14 provides leverage for shifting gears while also providing stability for the rider's foot and reducing any likelihood that the foot will slip off the foot board 14. Therefore, the significance of the curvature also relates to the placement of the foot on the foot board 14, and the desired fore-aft length of the foot board 14 along which the curvature is uniform and continuous can depend on the length of the rider's foot. In one embodiment of the invention, the foot board 14 defines a chord 36 (FIG. 2) between its frontmost and rearmost extents 32 and 34, the length of the chord 36 is about 12.75 inches (about 32 cm) and the curvature defines a segment height of about 1.25 inches (about 3 cm) relative to the chord 36, resulting in a radius of curvature of about 17 inches (about 43 cm). More generally, for proper operation of the foot board 14 a radius of curvature of not more than 40 inches (about 100 cm) is believed to be necessary between at least the regions of the foot board 14 that will be contacted by the toe and heel of the rider's shoe or boot, and more preferably between the ends 32 and 34 of the foot board 14. A suitable minimum radius for this same region is believed to be about 10 inches (about 25 cm). A more preferred range for the radius over the same region is believed to be about 14 to about 21 inches (about 35 to about 53 cm).

Various materials can be used to construct the components of the assembly 10 shown in FIGS. 1 and 2. As nonlimiting examples, the foot board 14, rocker arm 16, shift arm 20, support arms 22, brackets 24, mounting plate 26, and spacer 30 can be formed of high-grade aluminum, the shift linkage 12 can be constructed of steel or high-grade aluminum, and the shaft 18 can be constructed of steel.

Figure 3:
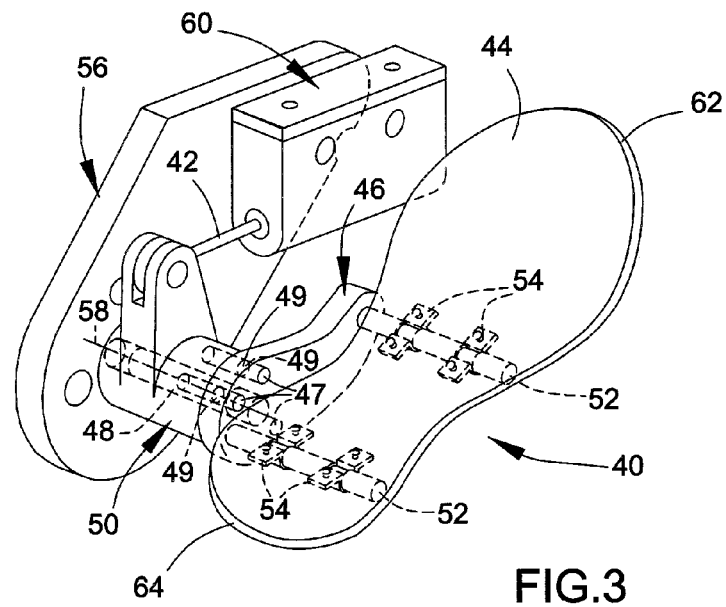
FIG. 3 is a perspective view of a foot board configured as a braking assembly in accordance with another embodiment of this invention.
Figure 4:
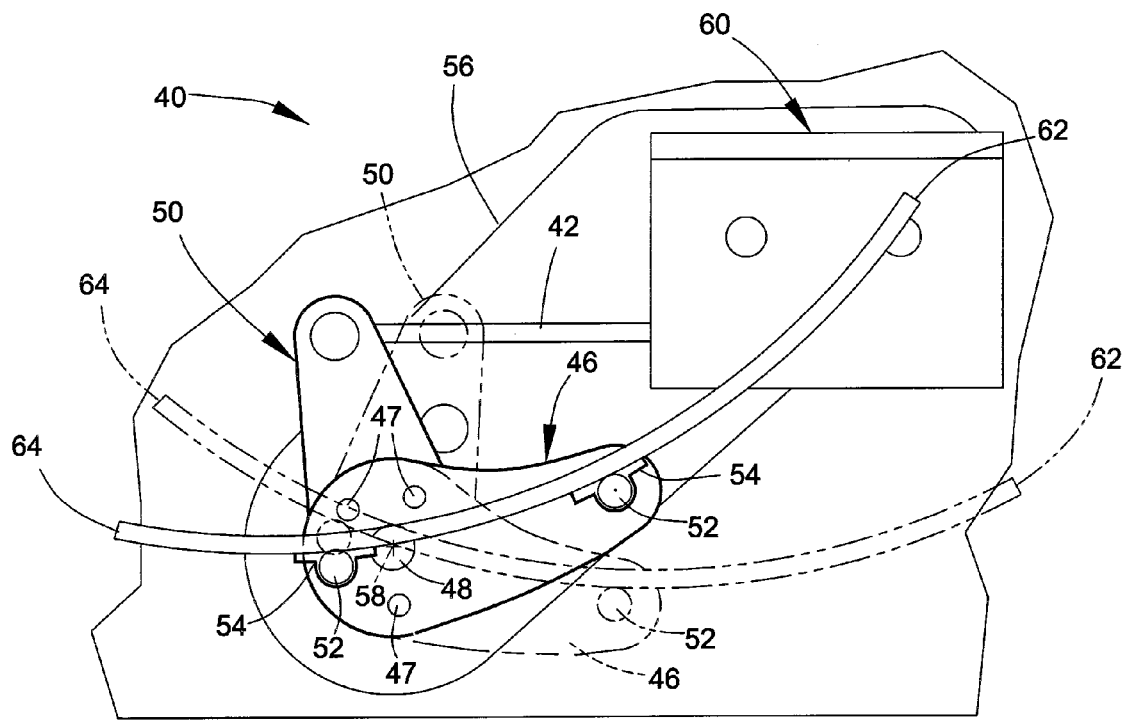
FIG. 4 represents a side view of the foot board of FIG. 3.

Referring now to FIGS. 3 and 4, a braking assembly 40 is represented as being adapted to perform a braking operation of a motorcycle (not shown). The braking assembly 40 can be installed on the same motorcycle as the gear shifting assembly 10 of FIGS. 1 and 2. As with conventional foot-operated brake pedals commonly found on motorcycles, the braking assembly 40 is preferably configured so that downward motion of the rider's toe will cause a brake to engage, typically though not necessarily the rear brake of the motorcycle. As represented in FIGS. 3 and 4, the brake may by hydraulically operated, in which case the motorcycle may already be equipped with a master cylinder assembly 60 that includes a brake fluid reservoir, and an adjustment rod 42 that actuates a piston within the cylinder assembly 60 for actuating a brake caliper (not shown). It is also within the scope of the invention to provide a master cylinder assembly, brake fluid reservoir and adjustment rod that are specially configured for use with the invention.

As evident from FIGS. 3 and 4, the braking assembly 40 shares similar features with the gear shifting assembly 10 of FIGS. 1 and 2. For example, the braking assembly 40 comprises a foot board 44, a rocker arm 46 to which the foot board 44 is mounted, a shaft 48 on which the rocker arm 46 is mounted for rotation, and a pivot arm 50 mounted on the shaft 48 so that the rocker and pivot arms 46 and 50 rotate together, preferably though not necessarily with the shaft 48. The foot board 44 is secured to the rocker arm 46 in a manner that prevents the board 44 from rotating relative to the rocker arm 46. In FIGS. 3 and 4, the board 44 is shown secured to the rocker arm 46 with support arms 52 assembled with brackets 54 located on the bottom of the foot board 44, though other attachment methods are possible and within the scope of the invention. Finally, a mounting plate 56 is provided for securing the assembly 40 to a motorcycle (not shown), such as a portion of the motorcycle's frame. It should be understood that the assembly 40 is not limited to any particular configuration for the mounting plate 56, in that the mounting plate 56 may be fabricated to have any configuration necessary to allow the assembly 40 to be mounted to any particular motorcycle.

Similar to the shaft 18 of FIGS. 1 and 2, the shaft 48 is preferably pivotably mounted within a bore formed in the mounting plate 56, and a bushing or other bearing assembly (not shown) can be used to mount the shaft 48 within the plate 56 to promote its ability to rotate relative to the plate 56. The rocker arm 46, pivot arm 50 and mounting plate 56 are assembled with the shaft 48 so that the shaft 48 is oriented transverse to the foot board 44 and defines a pivot axis 58 that is preferably perpendicular to the fore-aft direction of the motorcycle. The pivot arm 50 is pivotally coupled to one end of the master cylinder rod 42 so that rotation of the foot board 44, rocker arm 46 and pivot arm 50 about the pivot axis 58 defined by the shaft 48 causes the arm 50 to move the rod 42 back and forth, and thereby actuate the master cylinder 60 to perform the braking operation with the brake of the motorcycle. The pivot arm 50 is between the rocker arm 46 and mounting plate 56 and is shown as having a sufficient axial length to position the rocker arm 46 at a distance from the mounting plate 56 and thereby position the foot board 44 at a desirable location relative to the side of the motorcycle.

The pivot arm 50 is shown in FIGS. 3 and 4 as directly attached to the rocker arm 46 for rotation with the rocker arm 46 (and, optionally, with the shaft 48), contrary to the embodiment of FIGS. 1 and 2 in which the rocker arm 16 and shift arm 20 are both directly secured to the shaft 48 for rotation together with the shaft 18. For this purpose, fasteners 47 are represented as attaching the rocker arm 46 to the pivot arm 50. In the embodiment shown, the multiple threaded bores 49 are provided in the face of the pivot arm 50 facing the rocker arm 46 so that the rocker arm 46 is adjustably secured to the pivot arm 50 and, as a result, the foot board 44 and rocker arm 46 have multiple possible angular orientations relative to the pivot arm 50. With this feature, the angular orientation of the foot board 44 relative to the pivot axis 58 can be adjusted to promote the comfort of the rider.

In the configuration shown in FIGS. 3 and 4, the foot board 44 provides a foot rest for the right foot of the rider of the motorcycle on which the assembly 40 is installed. Because the foot board 44 is secured to the rocker arm 46, the foot board 44 can be pivoted with the rider's right foot to cause the pivot arm 50 to rotate, and thereby actuate the master cylinder rod 42. As such, the foot board 44 is also able to entirely replace a conventional brake pedal and lever of a conventional motorcycle, as opposed to being in addition to an existing brake pedal and lever. As previously noted, the foot board 44 is mounted with the shaft 48 to have a pivoting or rocking action about the pivot axis 58 of the shaft 48, which is oriented transverse to the foot board 44. In this manner, the foot board 44 can be pivoted in forward and rearward directions relative to the motorcycle, which in this sense means clockwise and counterclockwise directions, respectively, when viewing the righthand side of the motorcycle.

Importantly, to achieve the desired pivot/rocking action for the foot board 44 capable of actuating the master cylinder rod 42 in the forward direction, the axis 58 is disposed between the frontmost and rearmost extents 62 and 64 of the foot board 44. According to a preferred aspect of the invention, the majority of the foot board 44 is located forward of the axis 58. More preferably, more than half up to about three-quarters of the foot board 44 is located forward of the axis 58, and in a particular embodiment about two-thirds of the foot board 44 is located forward of the axis 58. Furthermore, the foot board 44 is preferably disposed on the pivot axis 58. By arranging the foot board 44 and shaft 48 so that the pivot axis 58 defined by the shaft 48 extends through the width of the foot board 44, the foot board 44 has a truer rocking action about the pivot axis 58, in contrast to the swinging action of the foot board 14 about the pivot axis 28 of FIGS. 1 and 2. However, it is foreseeable that the pivot axis 58 could pass just above or below the foot board 44, though the distance therebetween is preferably less than one inch (about 2.5 cm) and more preferably less than one-half inch (about 1 cm) in order to nearly achieve a rocking/pivoting action with the foot board 44. The pivoting motion of the foot board 44 is believed to be within the ability of a rider having limited lower leg movement to allow the rider to pivot the assembly 40 about the pivot axis 58 and, in so doing, actuate the master cylinder rod 42 by pressing downward with the toe near the frontmost end 62 of the foot board 44, causing the end 62 of the foot board 44 to pitch down similar to the normal feel of a conventional brake pedal. Thus, braking can be performed with a simple rocking motion of the rider's right foot without requiring removal of the foot from the foot board 44.

The foot board 44 of FIGS. 3 and 4 preferably has the same range of curvatures and preferred curvatures as those described for the foot board 14 of FIGS. 1 and 2, such that the upper surface of the foot board 44 is concave. For the reasons described previously in reference to FIG. 2, the curvature of the upper surface of the foot board 44 is preferably uniform and continuous along its entire length between its frontmost and rearmost extents 62 and 64, or at least within the surface region of the board 44 that will be contacted by the rider's right foot. Furthermore, the foot board 44 may have the same shape and dimensions as described for the foot board 14 of FIG. 2. Finally, various materials can be used to construct the components of the braking assembly 40 shown in FIGS. 3 and 4, including the aluminum, bronze and steel materials noted for the assembly 10 of FIGS. 1 and 2.

In use, a person riding a motorcycle on which either or both of the assemblies 10 and 40 are installed is able to place his or her feet on the foot boards 14 and 44, and simply rock his/her feet to shift gears and apply the brake as previously described. As also previously described, the foot boards 14 and 44 offer significant advantages. The foot boards 14 and 44 offer a more comfortable support than standard foot pegs, and the rider is able to perform shifting and braking operations while the rider's feet remain on the foot boards at all times, in contrast to prior art foot boards that require the rider to lift the toe or heel in order to shift gears and/or apply a brake. These aspects of the invention are particularly beneficial to a rider whose lower legs have limited mobility due to a health condition or a previous injury.

In addition to these comfort and convenience-related benefits, the braking assembly 40 is capable of providing significant safety features. Since the rider is not required to lift his/her right foot off a foot peg or foot board and place the foot onto a separate brake pedal in order to actuate a brake with the brake pedal, the time required to actually begin braking can be significantly reduced, enabling the rider to stop faster. Regardless of the speed or the time necessary to apply the rear brake by conventional means, the braking assembly 40 reduces reaction time and provides the ability to stop faster, which has the potential for avoiding accidents and saving lives.

It should be further noted that the ease with which a rider can shift gears with the assembly 10 and brake with the assembly 40 is promoted by key features of the invention, namely, the location of the shafts 18 and 48 that define the pivot axes 28 and 58, and the contours (curvatures) of the foot boards 14 and 44. As previously described, the location of the pivot axes 28 and 58 with respect to the positions and contours of the foot boards 14 and 44 provide the rider with the ability to easily shift gears and apply the brake, respectively. In particular, because the foot board 14 passes below its pivot axis 28, a swinging action is achieved by which both forward and rearward rotations of the shaft 18 can be easily produced by pressing downward on either end 32 or 34 of the foot board 14, whereas a truer pivot action is achieved with the foot board 44 because the axis 58 passes through the board 44, so that a forward rotation of the shaft 48 can be easily achieved by pressing downward on the frontmost end 62 of the foot board 44. As also previously noted, the contours of the foot boards 14 and 44 also provide leverage for shifting gears and applying the brake, while also providing stability for the rider's feet and reducing the likelihood that the rider's feet might slip off the foot boards 14 and 44.

While the invention has been described in terms of specific embodiments, it is apparent that other forms could be adopted by one skilled in the art. For example, the physical configuration of the assemblies 10 and 40 and their components could differ from those shown, and materials and processes other than those noted could be used. As a particular example, the outlines of the foot boards 14 and 44 are not required to correspond to the outline of a boot or shoe as depicted in the figures, and instead the foot boards 14 and 44 can be fabricated to have a wide variety of shapes, including ornamental shapes that may appeal to various segments of the population. Therefore, the scope of the invention is to be limited only by the following claims.

The invention claimed is:

1. A foot-operated assembly for a motorcycle having a front and rear, the assembly comprising:
   a shaft defining a pivot axis;
   means for mounting the shaft to the motorcycle;
   a rocker arm coupled the shaft so that the rocker arm is rotatable about the pivot axis;
   a second arm interconnected with the rocker arm so that rotation of the rocker arm in a direction causes the second arm to rotate as a unit in the same direction about the pivot axis thereof;
   means on the second arm for coupling the second arm to a member chosen from the group consisting of a gear shifter linkage and a brake cylinder rod of the motorcycle; and
   a foot board attached to the rocker arm so that the foot board and the rocker arm rotate together and motion of the foot board causes the foot board, the rocker arm and the second arm to rotate in the same direction about the pivot axis;
   wherein the foot board has a portion thereof offset from the pivot axis and motion of the foot board relative to the pivot axis is not strictly or just a pivot action but instead is a swinging motion beneath the pivot axis, the swinging motion of the foot board causes rotation of the rocker arm and the second arm in the same direction about the pivot axis, the swinging motion of the foot board in a forward direction towards the front of the motorcycle causes the member to move in a rearward direction towards the rear of the motorcycle, and the swinging motion of the foot board in the rearward direction towards the rear of the motorcycle causes the member to move in the forward direction towards the front of the motorcycle.

2. The foot-operated assembly according to claim 1, wherein the second arm is coupled to a gear shifter linkage.

3. The foot-operated assembly according to claim 1, wherein the mounting means rotatably mounts the shaft to the motorcycle.

4. The foot-operated assembly according to claim 1, wherein the portion of the foot board is spaced at least 2.5 centimeters from the pivot axis.

5. The foot-operated assembly according to claim 1, wherein the portion of the foot board is spaced about 5 to about 8 centimeters from the pivot axis.

6. The foot-operated assembly according to claim 1, wherein greater than half and up to about three-quarters of a length of the foot board transverse to the pivot axis is located to one side of the pivot axis.

7. The foot-operated assembly according to claim 1, wherein;
the rocker arm is secured to the shaft so that rotation of the rocker arm causes the shaft to rotate about the pivot axis; and
the second arm is secured to the shaft so that rotation of the shaft causes the second arm to rotate about the pivot axis.

8. A foot-operated assembly for a motorcycle having a front and rear, the assembly comprising:
a shaft defining a pivot axis;
means for mounting the shaft to the motorcycle;
a rocker arm coupled to the shaft so that the rocker arm is rotatable about the pivot axis;
a second arm interconnected with the rocker arm so that rotation of the rocker arm in a direction causes the second arm to rotate as a unit in the same direction about the pivot axis thereof;
means on the second arm for coupling the second arm to a member chosen from the group consisting of a gear shifter linkage and a brake cylinder rod of the motorcycle; and
a foot board attached to the rocker arm so that the foot board and the rocker arm rotate together and motion of the foot board causes the foot board, the rocker arm and the second arm to rotate in the same direction about the pivot axis;
wherein the pivot axis passes through a portion of the foot board, the foot board has a portion thereof offset from the pivot axis and motion of the foot board relative to the pivot axis is not strictly or just a pivot action but instead is a swinging motion beneath the pivot axis, the swinging motion of the foot board causes rotation of the rocker arm and the second arm in the same direction about the pivot axis, the swinging motion of the foot board in a forward direction towards the front of the motorcycle causes the member to move in a rearward direction towards the rear of the motorcycle, and the swinging motion of the foot board in the rearward direction towards the rear of the motorcycle causes the member to move in the forward direction towards the front of the motorcycle.

9. The foot-operated assembly according to claim 8, wherein greater than half and up to about three-quarters of a length of the foot board transverse to the pivot axis is located to one side of the pivot axis.

10. The foot-operated assembly according to claim 8, wherein the rocker arm is adjustably secured to the second arm so that the foot board and the rocker arm have multiple possible angular orientations relative to the second arm and in a plane transverse to the pivot axis.

11. The foot-operated assembly according to claim 1, wherein the foot-operated assembly is installed on the motorcycle.

12. The foot-operated assembly according to claim 11, wherein the second arm is coupled to a gear shifter linkage of a transmission of the motorcycle.

13. The foot-operated assembly according to claim 1, wherein the mounting means comprises a plate secured to a frame of the motorcycle.

14. The foot-operated assembly according to claim 11, wherein the portion of the foot board is spaced at least 2.5 centimeters below the pivot axis.

15. The foot-operated assembly according to claim 11, wherein the portion of the foot board is spaced about 5 to about 8 centimeters below the pivot axis.

16. The foot-operated assembly according to claim 11, wherein greater than half and up to about three-quarters of a length of the foot board transverse to the pivot axis is located forward of the pivot axis.

17. A method of using the foot-operated assembly according to claim 1, the method comprising:
installing the foot-operated assembly on a motorcycle;
pressing down on a forward end of the foot board to actuate a gear shifter linkage and thereby downshift a transmission of the motorcycle; and
pressing down on a rearward end of the foot board to actuate the gear shifter linkage and thereby upshift the transmission of the motorcycle.

18. A method of using the foot-operated assembly according to claim 1, the method comprising:
installing the foot-operated assembly on a motorcycle;
pressing down on a forward end of the foot board to actuate a brake cylinder rod of the motorcycle and thereby apply a brake of the motorcycle; and
pressing down on a rearward end of the foot board to actuate the brake cylinder rod and thereby release the brake of the motorcycle.

* * * * *